(12) United States Patent
Greenlee

(10) Patent No.: US 7,152,515 B1
(45) Date of Patent: Dec. 26, 2006

(54) WIRE CUTTER FOR ARTIFICIAL FLOWER STEMS

(76) Inventor: Wilfred Earl Greenlee, 4423 Eagles Cove Ct., Louisville, KY (US) 40241-4802

( * ) Notice: Subject to any disclaimer, the term of this patent is extended or adjusted under 35 U.S.C. 154(b) by 0 days.

(21) Appl. No.: 10/884,822

(22) Filed: Jul. 2, 2004

(51) Int. Cl.
B26D 1/26 (2006.01)
B26D 3/16 (2006.01)
B26D 5/16 (2006.01)
B26D 7/01 (2006.01)

(52) U.S. Cl. ............... 83/544; 83/524; 83/574; 83/589; 83/597; 83/602; 83/605; 83/694; 83/860

(58) Field of Classification Search ............ 83/574, 83/588, 589, 597, 598, 601, 602, 605, 860, 83/42, 203, 205, 283, 524–526, 544, 607–609, 83/628, 633, 634, 651, 673, 675, 694, 859, 83/950; 30/90.1, 92, 108
See application file for complete search history.

(56) References Cited

U.S. PATENT DOCUMENTS

| | | | | |
|---|---|---|---|---|
| 1,883,831 A | * | 10/1932 | Stratton | 30/127 |
| 3,049,956 A | * | 8/1962 | Lynch, Sr. | 83/468.7 |
| 3,765,276 A | * | 10/1973 | Pollitt | 81/9.51 |
| 3,854,205 A | * | 12/1974 | Boskus, Jr. | 30/231 |
| 3,951,016 A | * | 4/1976 | Gudmestad et al. | 81/9.51 |
| 3,996,782 A | * | 12/1976 | Sgariglia | 72/332 |
| 4,108,034 A | * | 8/1978 | Thomas | 83/361 |
| 4,187,745 A | * | 2/1980 | Lambert | 81/9.51 |
| 4,419,798 A | * | 12/1983 | Fairchild | 29/33 T |
| 4,584,912 A | * | 4/1986 | Gudmestad et al. | 81/9.51 |
| 5,445,051 A | * | 8/1995 | Carpenter et al. | 81/9.51 |
| 5,896,786 A | * | 4/1999 | Akita | 81/9.41 |
| 6,230,598 B1 | * | 5/2001 | Ressler | 83/372 |
| 6,253,651 B1 | * | 7/2001 | Bessemer | 83/42 |
| 6,311,581 B1 | * | 11/2001 | Hsieh | 81/9.51 |
| 6,526,857 B1 | * | 3/2003 | Roush et al. | 83/574 |
| 6,880,378 B1 | * | 4/2005 | McCarthy et al. | 72/326 |

* cited by examiner

*Primary Examiner*—Clark F. Dexter

(57) ABSTRACT

Cutter suitable for artificial flower stems. Typically, plastic coated wire stems are cut with hand cutters to various lengths in preparing artificial floral arrangements. The invention requires far less physical effort by the operator than is required when using conventional wire cutters. In the preferred use of the preferred embodiment of the invention, an uncut stem is inserted crosswise through two elongated holes in the guard housing. When the cutter jaws open, the stem is pushed into the open jaws and is cut to a desired length from the flower end when the jaws close. In the preferred embodiment of the invention a gear reduction motor drives an arm and cam roller assembly. That cam roller forces the top handle of the cutter downward causing the jaws to close. As the cycle continues, the cam roller raises and a spring causes the jaws to open.

8 Claims, 3 Drawing Sheets

WIRE CUTTER FOR ARTIFICIAL FLOWER STEMS

BACKGROUND

Floral designers across the nation are using hand wire cutters on a weekly basis. Each cut of artificial flower stems varies in intensity according to the diameter and density of the wire inside the stem. This cumulative effect from repeatedly cutting the stems, through time, can cause painful injuries like tendonitis, carpal tunnel syndrome, cubital tunnel syndrome and thoracic outlet compression. Any one of these repetitive strain injuries can be debilitating. One source reported research involving numerous interviews with floral designers, physical therapists, doctors and other medical professionals revealed rampant occurrences of these repetitive strain injuries in the floral industry. These injuries cause decreased production and shortened careers, cost thousands of dollars in workers compensation, and result in needless pain and suffering, expensive therapeutic treatment, and, often, permanent damage. It is, therefore, a primary objective of this invention to provide a fast, easy and safe way to cut the wire centered stems without any physical injuries.

CROSS-REFERENCE TO RELATED APPLICATIONS

Not applicable

STATEMENT REGARDING FEDERALLY SPONSORED RESEARCH OR DEVELOPMENT REFERENCE TO SEQUENCE LISTING, A TABLE, OR A COMPUTER PROGRAM LISTING COMPACT DISK APPENDIX

Not applicable

SUMMARY OF THE INVENTION

While this invention is susceptible of embodiment in many different forms, there is shown in the drawings and will herein be described in detail one specific embodiment, with the understanding that the present disclosure of that embodiment is to be considered as an example of the principles and not intended to limit the invention to the specific embodiment shown and described.

The wire cutter of the preferred embodiment of the invention disclosed here includes an electric powered gear reduction motor with an arm keyed to the output motor shaft. The arm powers a cam roller assembly. The cam roller operates a hand wire cutter secured to a base plate that also supports the motor. The cam roller assembly forces the upper cutter handle downward and closes the cutter jaws that cut the wire centered stem. Spring action built in the hand cutter opens the cutter jaws when the cam roller exits the end of the handle. A clear plastic guard covers the entire mechanism protecting the operator and customers.

DESCRIPTION OF THE PREFERRED EMBODIMENTS

Figure 1:
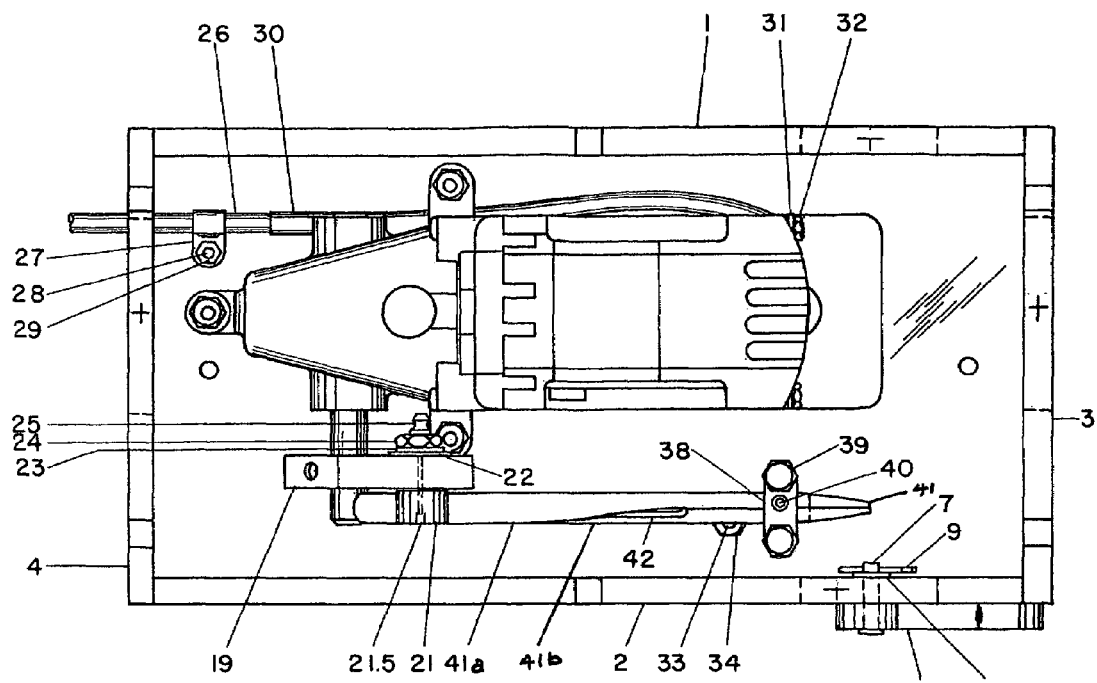
FIG. 1 is a top view of the entire assembly.

While this invention is susceptible of embodiment in many different forms, there is shown in the drawings and will herein be described in detail one specific embodiment, with the understanding that the present disclosure of that embodiment is to be considered as an example of the principles and not intended to limit the invention to the specific embodiment shown and described.

The preferred embodiment of the cutter device is made using the following parts and are configured as indicated on the figures:

1 Base Plate 10
1 Gear Reduction Electric Motor 14
3 Hex Head Bolts, Stainless Steel 11
3 Washers, Stainless Steel 15
3 Nylon Spacers 13
3 Lock Washers, Stainless Steel 16
3 Hex Head Nuts, Stainless Steel 17
1 Woodruff Key 18
1 Cam Roller Arm 19
1 Allen Set Screw 20
1 Cam Follower Assembly 21
1 Cam Follower Shaft 21.5
1 Washer, Stainless Steel 22
1 Lock Washer, Stainless Steel 23
1 Hex Head Jam Nut 24
1 Grease Fitting 25
1 Electric Cord and Switch 26
1 Cable Clamp 27
1 Electric Shrink Wrap 30
1 Socket Head Allen Screw 28
1 Hex Nut, Stainless Steel 29
1 Eyelet for Ground Wire on Motor 31
1 Green Nut on Motor for Ground Wire 32
1 Allen Set Screw 33
1 Hex Head Jam Nut, Stainless Steel 34
2 Hex Head Bolts, Stainless Steel 35
2 Nylon Spacers 36
2 Nylon Spacers 37
1 Lever Adjustment Plate, Stainless Steel 38
2 Crown Hex Nuts 39
1 Allen Set Screw 40
1 Modified Hand Wire Cutters 41
1 Spring 42
1 Socket Head Allen Screw 43
6 Washers, Stainless Steel 44
1 Hex Head Nut, Stainless Steel 45
1 Guard housing The guard housing is made of clear plastic, provides openings that permit air circulation for cooling the gear motor, wherein two of the openings in plates 3 and 4 provide means for lifting the housing from the mounting base when required. Further, the guard housing is assembled and secured with acrylic solvent cement or an equivalent. The guard housing is made using the following parts and are configured as indicated on the figures:

1 Side Plate, Clear Acrylic 1
1 Side Plate, Clear Acrylic 2
1 Front Plate, Clear Acrylic 3
1 Rear Plate, Clear Acrylic 4
1 Top Plate, Clear Acrylic 5
1 Guard, Clear Acrylic 6
1 Clevis Pin 7
1 Aircraft Washer 8
1 Cotter Pin 9

Figure 2:
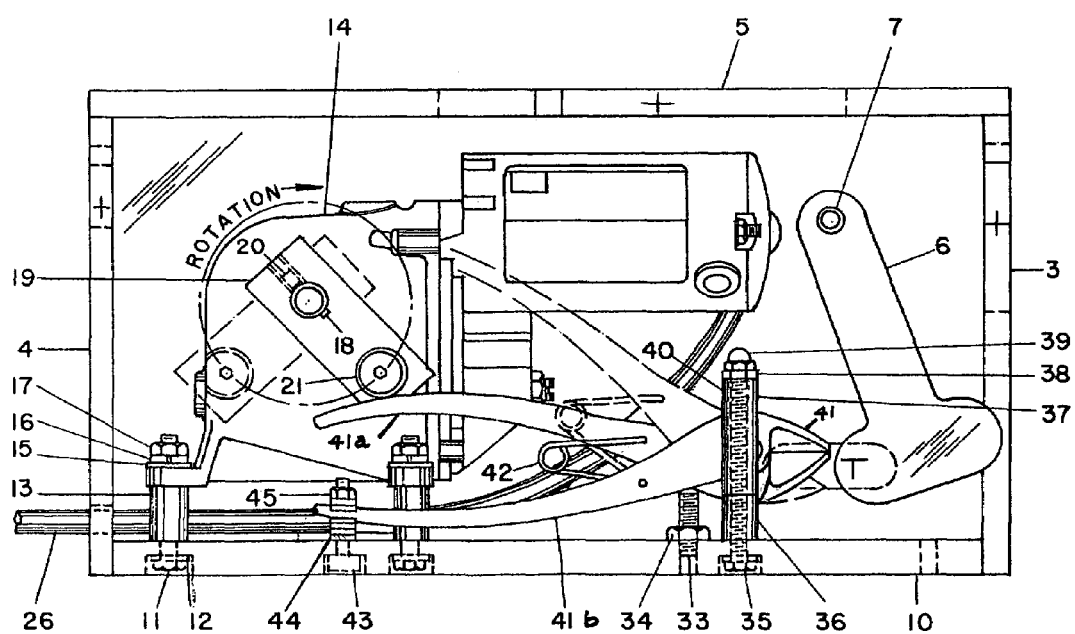
FIG. 2 is a side view of FIG. 1.
Figure 3:
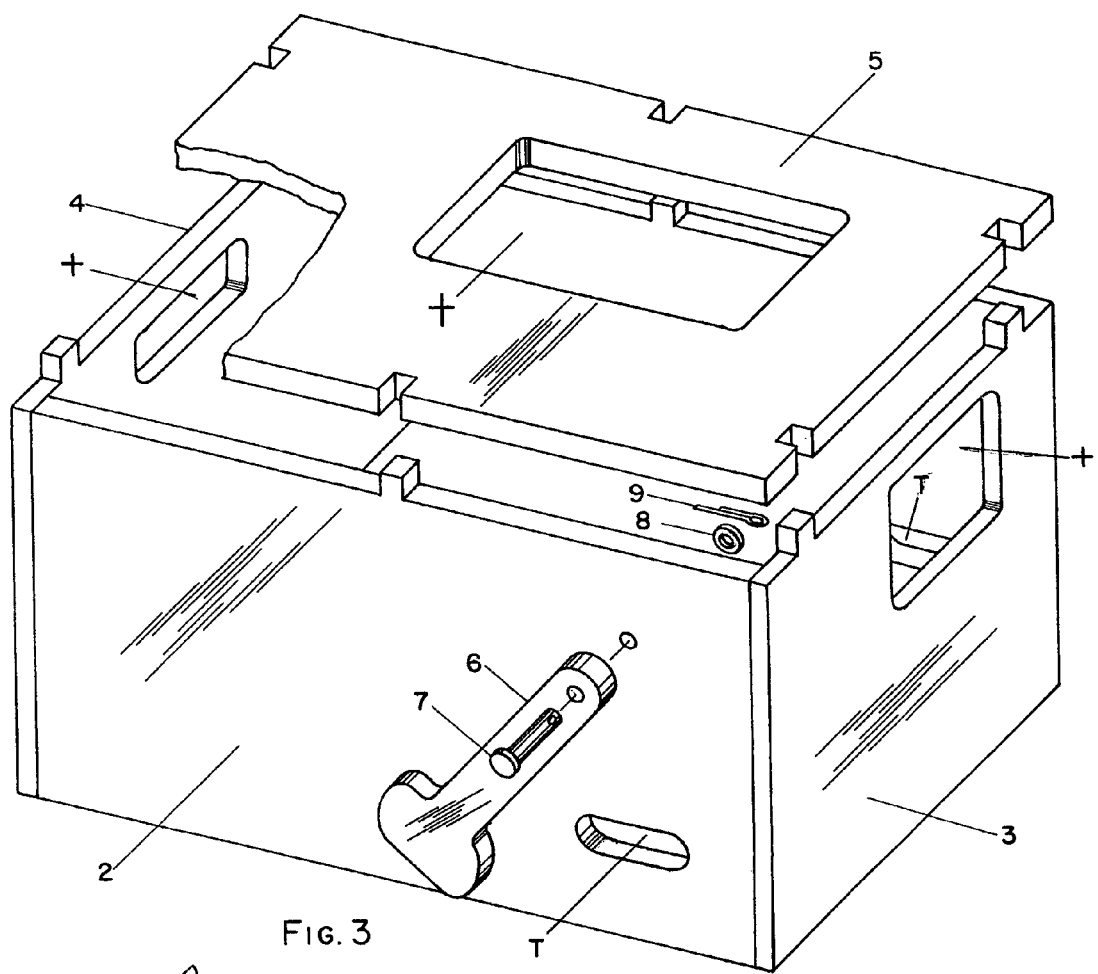
FIG. 3 is an isometric view of the transparent safety guard assembly.
Figure 4:
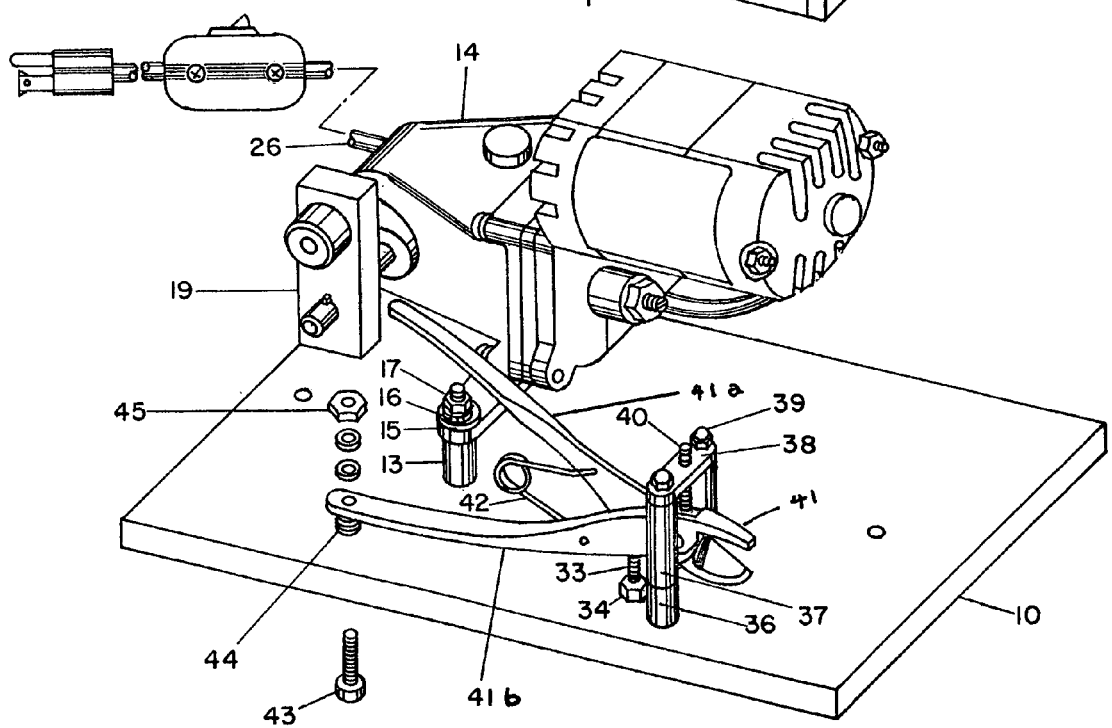
FIG. 4 is an isometric view of the reduction motor, arm and cam roller assembly, the fixture held cutter assembly and base plate.
Figure 5:
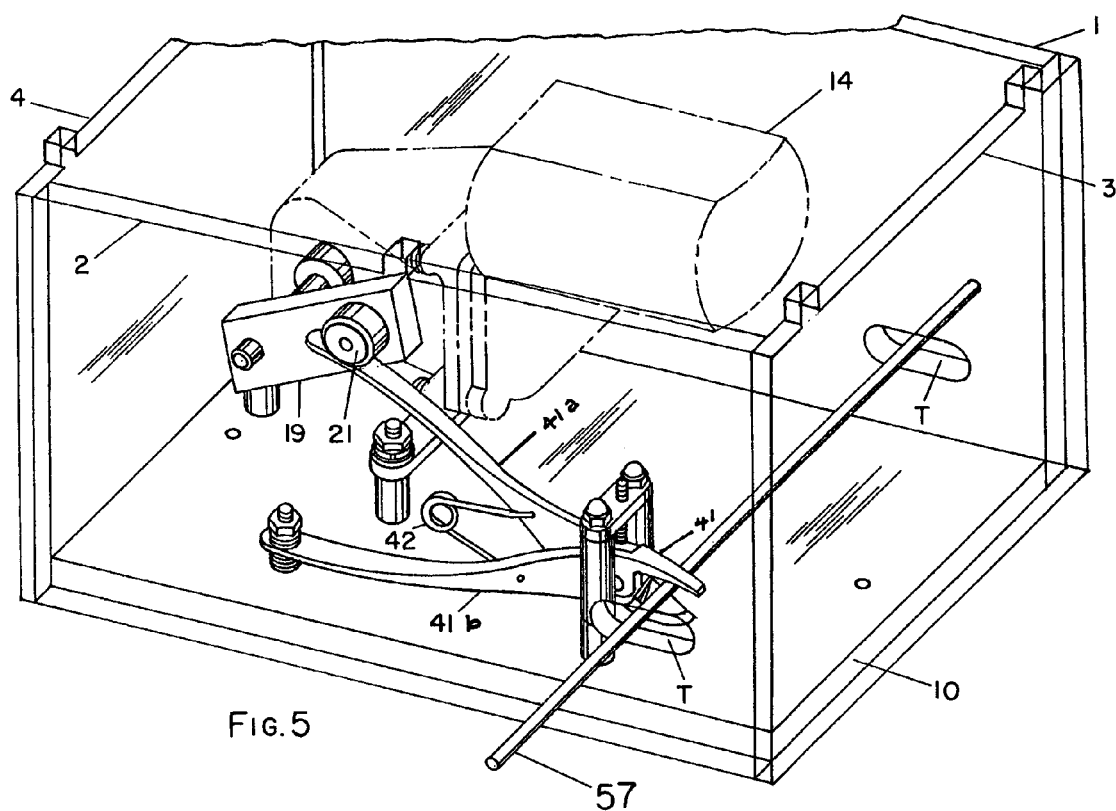
FIG. 5 is a partial isometric view showing a floral wire centered stem prior to being cut into two pieces.
Figure 6:
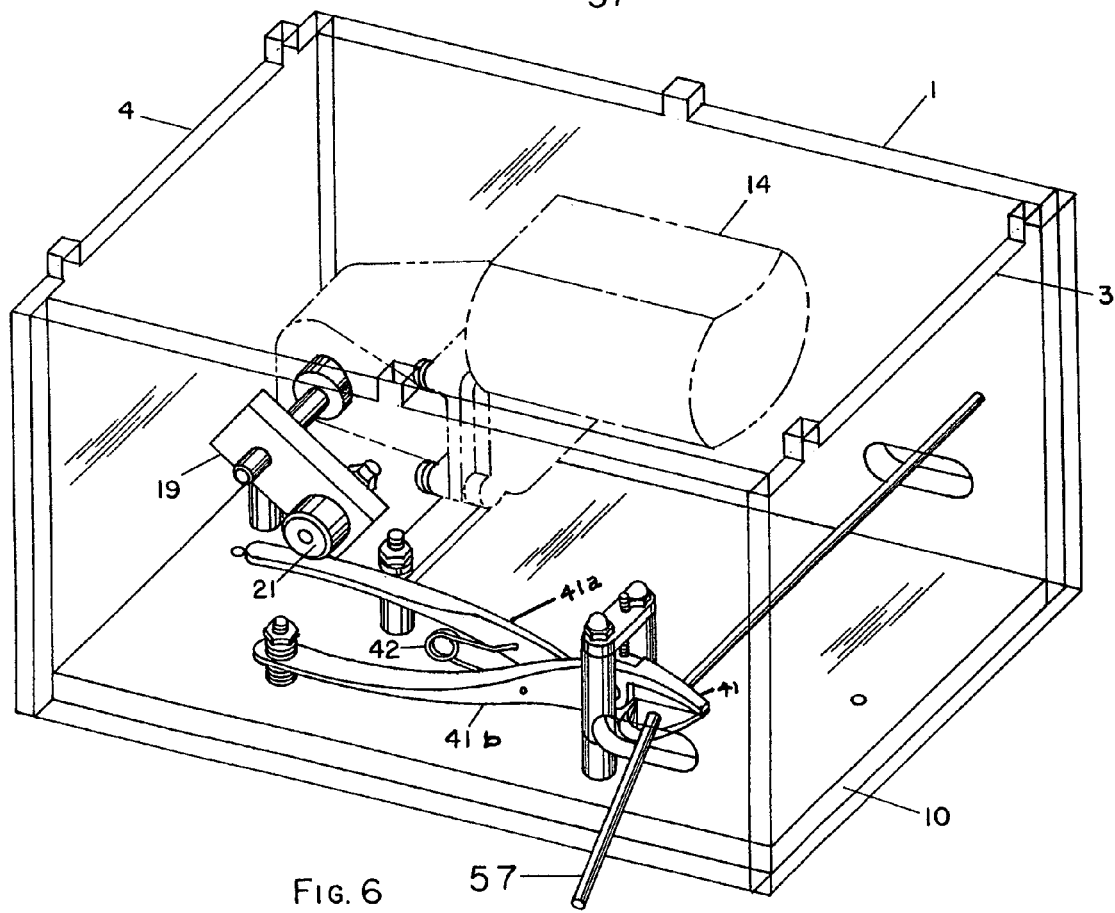
FIG. 6 is a partial isometric view showing a floral wire centered stem after being cut into two pieces.

The preferred operation of the preferred embodiment of the invention disclosed here is as follows: Firstly, the electric gear reduction motor 14 and wire cutter 41 are secured to the aluminum plate 10. Secondly, starting with the handles or levers 41a, 41b of cutters 41 open as shown in phantom lines FIG. 2, the gear reduction motor output shaft drives the cam roller arm 19, this cam roller arm supports the cam roller assembly 21 and 21.5 shaft. Thirdly, the cam roller arm 19 rotates clockwise and contacts the upper handle 41a of cutter 41 and forces it downward. This action closes the cutter jaws. Fourthly, when the cam roller leaves the end of the top handle 41a of cutter 41, spring 42 forces the cutter jaws to open. Fifthly, the opening and closing of the cutter jaws is continual at the rate of several times per minute. Sixthly, the wire centered stem to be cut to a predetermined length from the flower end is inserted through the elongated opening T of a first side plate 1 and exits through the opposite elongated opening marked T of a second side plate 2 after the safety guard 6 is moved out of the path of stem. Seventhly, when the stem to be cut is in the desired location, the stem is pushed using both hands into the open jaws. Eighthly, when the jaws close, the wire will be cut into two lengths. The left hand length will be removed from the left elongated opening. The right hand length will be removed from the right elongated opening. The swinging guard 6 returns to its original position when stem is removed. The cycle is repeated with another wire centered stem. The preferred embodiment of the invention disclosed here includes a set of modified hand cutters with one hole through the lower lever 41b of cutter; each side of this lever around the said hole is spot faced and this hole accepts a bolt with washers assembled to the said bolt beneath the lower level of cutter and washers assembled to the said bolt above the lower lever of the cutter and secured with one nut 8. The cutting end of cutter is held in position with a lower set screw and stop secured with one jam nut; other items holding cutter in position are two vertical nylon posts, two washers, two hexagon head bolts, two crown nuts, one top adjustment plate, and one adjustment screw for setting the return distance of the top wire cutter lever.

In the preferred embodiment of the invention disclosed here, the cam roller contacts the top cutter lever and forces it downward causing the cutter jaws to close; the cam roller exits the end of the lever after a stem or wire is cut and built-in spring pressure causes the top lever to rise to its original position; this action causes the jaws to open.

In the preferred embodiment of the invention disclosed here, the axis of the cam roller shaft is eccentric with the axis of the cam roller; this feature enables what is known as preload on the top layer to be adjustable; this adjustment is made by loosening nut 24, turning the cam roller shaft clockwise a predetermined number of degrees, and retorquing jam nut 24; this adjustment lengthens the distance from the center of the AC/DC gear motor's output shaft to the outside diameter of the cam roller; this adjustment will be made at time intervals when more preload is required to complete a cut through the floral stem wire. When the downward cam action is exhausted, the cam roller shaft is to be rotated to its original position.

On the preferred embodiment of the invention disclosed here, the cam roller assembly is designed to keep the horse power requirement low when the maximum cutting power is required to cut the wire. The cam roller is in a unique radial position to produce ultimate power when the cam roller is very close to the end of its stroke where it moves a much lesser distance downward per degree of rotation than the distance downward per degree of rotation during the earlier portion of the cut. This cam action ratio, gear motor reduction ratio, and the ratio resulting from the distance from the tip of the cutter lever 41a to the center of the cutter jaws all combined, produces the pressure required to cut the wire. It is reasoned that by using this design method on larger cross sections of metal to be cut, the cost will be less than using hydraulic machines or mechanisms.

The transparent plastic safety shield 5 of the preferred embodiment includes openings that permit air to circulate for cooling the gear motor; one of these elongated holes (marked with a symbol T) is equipped with a swing guard 6 to prevent physical contact with the cutting jaws when loading or unloading the floral wire stem; mating parts for this transparent plastic safety shield 5 are equipped with male projections and female receiving notches that strengthen and facilitate the assembly of the safety shield.

The preferred embodiment of the invention disclosed here permits servicing to be easily achieved by removing the hexagon nut and washers that secure the lower handle. The entire cutter assembly can be removed and replaced with a modified new or sharpened cutter assembly and secured with necessary washers and hexagon nut.

From the above description and drawings, it will be understood by those of ordinary skill in the art that the particular embodiments shown and described are for purpose of illustration only, and are not intended to limit the scope of the invention. Those of ordinary skill in the art will recognize that the invention may be embodied in other specific forms without departing from its spirit or essential characteristics. References to details of particular embodiments are not intended to limit the scope of the claims.

No claim element herein is to be construed under the provisions of 35 U.S.C. § 112, sixth paragraph, unless the element is expressly recited using the phrase "means for" or "step for."

What is claimed is:

1. An apparatus for cutting wire-containing artificial flower stems of various densities and diameters, whereby the apparatus also can be used for other applications in which wires need to be cut to various lengths, comprising:

a mounting base;
a housing connected to the mounting base and extending therefrom;
a motor disposed within the housing;
an arm and cam roller assembly disposed within the housing and driven by an output shaft of the motor; and
a wire cutter disposed within the housing for cutting a wire, the wire cutter including two lever portions pivotally connected together at midpoints thereof, the lever portions each including a cutting edge at one end thereof such that the cutting edges are opposed to one another, wherein a first one of the lever portions is fixed in position and a second one of the lever portions is driven at a second end of thereof by the cam and roller assembly to pivot the second lever portion with respect to the first lever portion and move the cutting edges from an open position to a closed position for cutting the wire to a desired length;

wherein the housing includes an opening in at least one wall thereof, and wherein the opening is aligned with the wire cutter for inserting the wire into the housing for cutting thereof, wherein a substantially straight path extending from the opening to and beyond the wire cutter is freely accessible by the wire for manually positioning the wire relative to the wire cutter so that the desired length can be cut, and wherein at least a portion of the housing is transparent so that the wire cutter and at least the portion of the path proximate the wire cutter are visible to enable an operator to see and position the wire relative to the wire cutter for cutting the wire to the desired length.

2. An apparatus as in claim 1, further comprising a swinging guard removably positioned over the opening.

3. An apparatus as in claim 2, in which substantially all of said housing is transparent.

4. An apparatus as in claim 3, in which said motor is a gear reduction electric motor.

5. An apparatus as in claim 1, in which substantially all of said housing is transparent.

6. An apparatus as in claim 5, in which said motor is a gear reduction electric motor.

7. An apparatus as in claim 1, in which said motor is a gear reduction electric motor.

8. An apparatus as in claim 1, in which said opening in at least one wall includes an opening in opposing walls, wherein the openings are aligned with the wire cutter for inserting the wire into and through the housing for cutting thereof.

* * * * *